United States Patent
Konishi

(10) Patent No.: US 12,260,581 B2
(45) Date of Patent: Mar. 25, 2025

(54) DISTANCE CALCULATION APPARATUS AND VEHICLE POSITION ESTIMATION APPARATUS

(71) Applicant: Honda Motor Co., Ltd., Tokyo (JP)

(72) Inventor: Yuichi Konishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 319 days.

(21) Appl. No.: 17/592,446

(22) Filed: Feb. 3, 2022

(65) Prior Publication Data

US 2022/0254056 A1    Aug. 11, 2022

(30) Foreign Application Priority Data

Feb. 9, 2021    (JP) ................... 2021-018762

(51) Int. Cl.
    G06T 7/73    (2017.01)
    G06V 10/40    (2022.01)
    G06V 20/58    (2022.01)

(52) U.S. Cl.
    CPC ............... G06T 7/73 (2017.01); G06V 10/40 (2022.01); G06V 20/58 (2022.01); *G06T 2207/30252* (2013.01)

(58) Field of Classification Search
    CPC . G06T 7/73; G06T 2207/30252; G06V 10/40; G06V 20/58; G06V 20/56; G06V 20/588; G06V 20/59; G01C 21/30
    See application file for complete search history.

(56) References Cited

U.S. PATENT DOCUMENTS

2018/0137373 A1*  5/2018  Rasmusson, Jr. ......... G06T 7/20
2020/0167950 A1    5/2020  Kaneko et al.
2021/0063578 A1*  3/2021  Wekel ................... G01S 17/894
2022/0178717 A1*  6/2022  Kume .................... G08G 1/202
2022/0179038 A1*  6/2022  Huffman .................. G01S 5/16

FOREIGN PATENT DOCUMENTS

| JP | 2017166846 A | 9/2017 |
|---|---|---|
| JP | 2019056629 A | 4/2019 |
| JP | 2020034322 A | 3/2020 |
| JP | 2020518917 A | 6/2020 |
| JP | 2020125960 A | 8/2020 |

OTHER PUBLICATIONS

Japanese office action; Application 2021-018762; Jun. 4, 2024.
Japanese office action; Application 2021-018762; Oct. 29, 2024.

* cited by examiner

*Primary Examiner* — Nancy Bitar

(74) *Attorney, Agent, or Firm* — Duft & Bornsen, PC

(57) ABSTRACT

A distance calculation apparatus includes an in-vehicle detection unit configured to detect a situation around a subject vehicle, and a microprocessor and a memory connected to the microprocessor. The microprocessor is configured to perform recognizing an object on the basis of a detection data detected by the in-vehicle detection unit, extracting feature points included in the detection data, recognizing a representative position of a predetermined object on the basis of a distribution of feature points corresponding to the predetermined object among the feature points extracted in the extracting when the predetermined object is recognized in the recognizing, and calculating a distance from the subject vehicle to the predetermined object on the basis of the representative position recognized in the recognizing.

5 Claims, 6 Drawing Sheets

DISTANCE CALCULATION APPARATUS AND VEHICLE POSITION ESTIMATION APPARATUS

CROSS-REFERENCE TO RELATED APPLICATION

This application is based upon and claims the benefit of priority from Japanese Patent Application No. 2021-018762 filed on Feb. 9, 2021, the content of which are incorporated herein by reference.

BACKGROUND OF THE INVENTION

Field of the Invention

This invention relates to a distance calculation apparatus configured to calculate a distance to an object around a vehicle and a vehicle position estimation apparatus configured to estimate a position of the vehicle.

Description of the Related Art

As this type of apparatus, there has been conventionally known an apparatus that acquires feature points of an object around a vehicle on the basis of an image captured by a camera mounted on the vehicle while the vehicle is driving, and generates map data of a road on which the vehicle is driving by using the feature points (see, for example, JP 2020-518917 A).

Meanwhile, in a case where feature points of an object are acquired and then a vehicle position on map data is estimated on the basis of the feature points, there is a case where a distance to the object is calculated on the basis of the position of the feature points and the vehicle position is estimated on the basis of the distance. At that time, in a situation where there is a plurality of feature points of the object, it is difficult to accurately calculate the distance to the object.

SUMMARY OF THE INVENTION

An aspect of the present invention is a distance calculation apparatus includes an in-vehicle detection unit configured to detect a situation around a subject vehicle, and a microprocessor and a memory connected to the microprocessor. The microprocessor is configured to perform recognizing an object on the basis of a detection data detected by the in-vehicle detection unit, extracting feature points included in the detection data, recognizing a representative position of a predetermined object on the basis of a distribution of feature points corresponding to the predetermined object among the feature points extracted in the extracting when the predetermined object is recognized in the recognizing, and calculating a distance from the subject vehicle to the predetermined object on the basis of the representative position recognized in the recognizing.

Another aspect of the present invention is a vehicle position estimation apparatus includes the above distance calculation apparatus, a map generation unit connected to generate a map using feature points included in the detection data detected by the in-vehicle detection unit, and a position estimation unit configured to estimates a position of the subject vehicle on the map generated by the map generation unit on the basis of the distance to the predetermined object calculated by the above distance calculation apparatus.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 5. The vehicle position estimation apparatus according to the embodiment of the present invention can be applied to a vehicle having a driving support capability or a self-driving capability. Hereinafter, an example in which the vehicle position estimation apparatus is applied to a vehicle (self-driving vehicle) having a self-driving capability will be described. Note that a vehicle to which the vehicle position estimation apparatus according to the present embodiment is applied may be referred to as a subject vehicle to be distinguished from other vehicles. Furthermore, the subject vehicle can drive not only in a self-drive mode in which a driving operation by a driver is unnecessary, but also in a manual drive mode by the driving operation by the driver.

Figure 1:
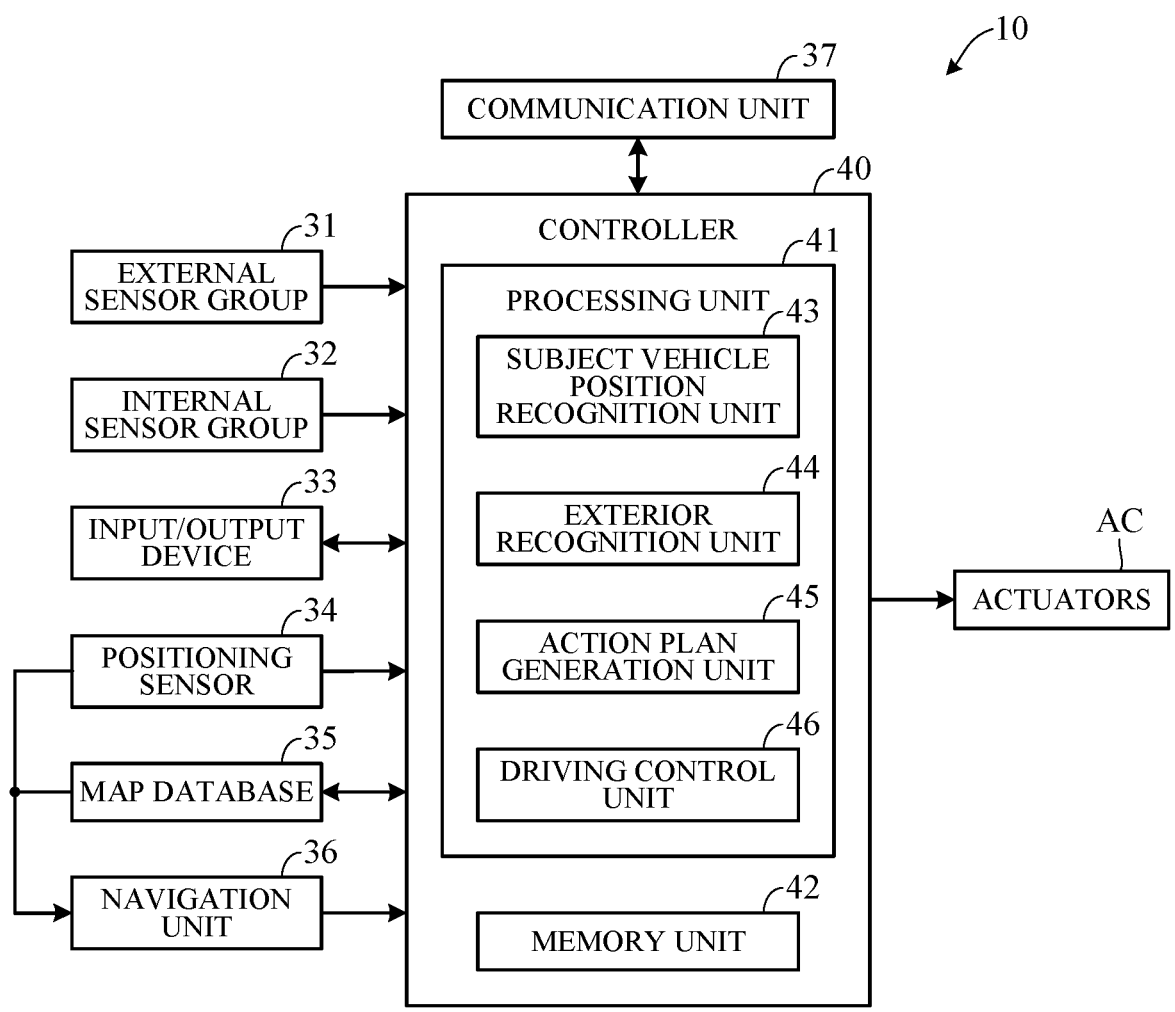
FIG. 1 is a block diagram schematically illustrating an overall configuration of a vehicle control system according to an embodiment of the present invention.

FIG. 1 is a block diagram schematically illustrating an overall configuration of a vehicle control system (vehicle control apparatus) that controls the subject vehicle. As illustrated in FIG. 1, a vehicle control system 10 mainly includes a controller 40, an external sensor group 31, an internal sensor group 32, an input/output device 33, a position measurement sensor 34, a map database 35, a navigation unit 36, a communication unit 37, and a driving actuator (hereinafter simply referred to as an actuator) AC each electrically connected to the controller 40.

The external sensor group 31 is a generic term for a plurality of sensors that detects an external situation, which is peripheral information of the subject vehicle. For example, the external sensor group 31 includes a LiDAR that measures scattered light with respect to irradiation light in all directions of the subject vehicle and measures a distance from the subject vehicle to surrounding obstacles, and a radar that detects other vehicles, obstacles, and the like around the subject vehicle by emitting electromagnetic waves and detecting reflected waves. Furthermore, for example, the external sensor group 31 includes a camera that is mounted on the subject vehicle, has an imaging element such as a CCD or a CMOS, and images a periphery (forward, backward and sideward) of the subject vehicle, a microphone that inputs a signal of a sound from the periphery of the subject vehicle (hereinafter, simply referred to as a microphone), and the like. A signal detected by the external sensor group 31 and a signal input to the external sensor group 31 are transmitted to the controller 40.

The internal sensor group 32 is a generic term for a plurality of sensors that detects a driving state of the subject vehicle and a state of the inside of the vehicle. For example, the internal sensor group 32 includes a vehicle speed sensor that detects a vehicle speed of the subject vehicle, an acceleration sensor that detects an acceleration in a front-rear direction and an acceleration in a left-right direction (lateral acceleration) of the subject vehicle, a rotation rate sensor that detects the rotation rate of a driving drive source, a yaw rate sensor that detects a rotation angular speed around a vertical axis of the center of gravity of the subject vehicle, and the like. The internal sensor group 32 further includes a sensor that detects driver's driving operation in a manual drive mode, for example, operation of an accelerator pedal, operation of a brake pedal, operation of a steering, and the like. A detection signal from the internal sensor group 32 is transmitted to the controller 40.

The input/output device 33 is a generic term for devices in which a command is input from a driver or information is output to the driver. For example, the input/output device 33 includes various switches to which the driver inputs various commands by operating an operation member, a microphone to which the driver inputs a command by voice, a display unit that provides information to the driver via a display image, a speaker that provides information to the driver by voice, and the like. The various switches include a manual automatic changeover switch (SW) that instructs either a self-drive mode or a manual drive mode.

The manual automatic changeover switch is configured as, for example, a switch manually operable by a driver, and outputs a changeover command to the self-drive mode in which a self-driving capability is enabled or the manual drive mode in which the self-driving capability is disabled according to a switch operation. Switching from the manual drive mode to the self-drive mode or switching from the self-drive mode to the manual drive mode can be instructed when a predetermined driving condition is satisfied regardless of operation of the manual automatic changeover switch. That is, by automatically switching the manual automatic changeover switch, the mode can be switched automatically, not manually.

The position measurement sensor 34 is, for example, a GPS sensor, receives a position measurement signal transmitted from a GPS satellite, and measures an absolute position (latitude, longitude, and the like) of the subject vehicle on the basis of the received signal. Note that the position measurement sensor 34 includes not only the GPS sensor but also a sensor that performs position measurement using radio waves transmitted from a quasi-zenith orbit satellite. A signal (signal indicating a measurement result) from the position measurement sensor 34 is transmitted to the controller 40.

The map database 35 is a device that stores general map information used for the navigation unit 36, and includes, for example, a hard disk. The map information includes road position information, information of a road shape (curvature or the like), and position information of intersections and branch points. Note that the map information stored in the map database 35 is different from highly accurate map information stored in a memory unit 42 of the controller 40.

The navigation unit 36 is a device that searches for a target route on a road to a destination input by a driver and provides guidance along the target route. The input of the destination and the guidance along the target route are performed via the input/output device 33. The target route is calculated on the basis of a current position of the subject vehicle measured by the position measurement sensor 34 and the map information stored in the map database 35.

The communication unit 37 communicates with various servers, which are not illustrated, via a network including a wireless communication network such as an Internet line, and acquires the map information, traffic information, and the like from the server periodically or at an arbitrary timing. The acquired map information is output to the map database 35 and the memory unit 42, and the map information is updated. The acquired traffic information includes traffic congestion information and traffic light information such as a remaining time until a traffic light changes from red to green.

The actuator AC is a device for operating various devices related to driving operation of the subject vehicle. The actuator AC includes a brake actuator that operates a brake device, a steering actuator that drives a steering device, and the like. The actuator AC is a driving actuator for controlling the driving of the subject vehicle. In a case where the driving drive source is an engine, the actuator AC includes a throttle actuator that adjusts an opening of a throttle valve of the engine (throttle opening). When the driving drive source is a drive motor, the drive motor is included in the actuator AC. The actuator AC also includes a brake actuator that operates a braking device of the subject vehicle and a steering actuator that drives a steering device.

The controller 40 includes an electronic control unit (ECU). Note that although a plurality of ECUs having different functions such as an engine control ECU and a transmission control ECU can be separately provided, in FIG. 1, the controller 40 is illustrated as a set of these ECUs for convenience. The controller 40 includes a computer including a processing unit 41 such as a CPU (microprocessor), the memory unit 42 such as a ROM, a RAM, and a hard disk, and other peripheral circuits, which are not illustrated.

The memory unit 42 stores highly accurate detailed map information including information of a center position of a lane, information of a boundary of a lane position, and the like. More specifically, road information, traffic regulation information, address information, facility information, telephone number information, and the like are stored as the map information. The road information includes information indicating the type of road such as a highway, a toll road, and a national highway, and information such as the number of lanes of a road, the width of each lane, a road gradient, a three-dimensional coordinate position of the road, a curvature of a curve of the lane, positions of the merging point and branch point of the lane, a road sign, and the presence or absence of a median strip. The traffic regulation information includes information indicating that driving on a lane is restricted or a road is closed due to construction or the like. Furthermore, the memory unit 42 stores data related to an environmental map described below. The memory unit 42 also stores information such as a shift map (shift diagram) serving as a reference of shift operation, various control programs, and a threshold used in the programs.

The processing unit 41 includes a subject vehicle position recognition unit 43, an exterior environment recognition unit 44, an action plan generation unit 45, and a driving control unit 46 as functional configurations related to automatic driving.

The subject vehicle position recognition unit 43 recognizes the position (subject vehicle position) of the subject vehicle on a map on the basis of the position information of the subject vehicle received by the position measurement sensor 34 and the map information of the map database 35. Note that the subject vehicle position recognition unit 43 may recognize the subject vehicle position by using the map information (information such as the shape of a building) stored in the memory unit 42 and the peripheral information of the subject vehicle detected by the external sensor group 31, whereby the subject vehicle position can be recognized with high accuracy. For example, the subject vehicle position recognition unit 43 can recognize the subject vehicle position using the map information stored in the memory unit 42 and the image data around the subject vehicle captured by the camera of the external sensor group 31. Furthermore, when the subject vehicle position can be measured by a sensor installed on the road or outside a road side, the subject vehicle position can be recognized with high accuracy by communicating with the sensor via the communication unit 37.

The exterior environment recognition unit 44 recognizes an external situation around the subject vehicle on the basis of the signal from the external sensor group 31 such as a LiDAR, a radar, and a camera. The exterior environment recognition unit 44 recognizes, for example, the position, speed, and acceleration of a surrounding vehicle (a forward vehicle or a rearward vehicle) driving around the subject vehicle, the position of a surrounding vehicle stopped or parked around the subject vehicle, and the positions and states of other objects. Other objects include signs, traffic lights, road boundaries, road stop lines, buildings, guardrails, utility poles, signboards, pedestrians, bicycles, and the like. The states of other objects include a color of a traffic light (red, green, yellow), the moving speed and direction of a pedestrian or a bicycle, and the like.

The action plan generation unit 45 generates a driving path (target path) of the subject vehicle from a current point of time to a predetermined time ahead on the basis of, for example, the target route calculated by the navigation unit 36, the subject vehicle position recognized by the subject vehicle position recognition unit 43, and the external situation recognized by the exterior environment recognition unit 44. When there is a plurality of paths that are candidates for the target path on the target route, the action plan generation unit 45 selects, from among the plurality of paths, an optimal path that satisfies criteria such as compliance with laws and regulations and efficient and safe driving, and sets the selected path as the target path. Then, the action plan generation unit 45 generates an action plan corresponding to the generated target path.

The action plan includes drive plan data set for each unit time Δt from a current point of time to a predetermined time T ahead, that is, drive plan data set in association with a time for each unit time Δt. The drive plan data includes position data of the subject vehicle and vehicle state data for each unit time. The position data is, for example, data of a target point indicating a two-dimensional coordinate position on the road, and the vehicle state data is vehicle speed data indicating the vehicle speed, direction data indicating the direction of the subject vehicle, or the like. The drive plan is updated every unit time.

The action plan generation unit 45 generates the target path by connecting the position data for each unit time Δt from the current point of time to the predetermined time T ahead in time order. At this time, the acceleration (target acceleration) for each unit time Δt is calculated on the basis of the vehicle speed (target vehicle speed) of each target point for each unit time Δt on the target path. That is, the action plan generation unit 45 calculates the target vehicle speed and the target acceleration. Note that the target acceleration may be calculated by the driving control unit 46.

When the action plan generation unit 45 generates the target path, the action plan generation unit 45 first determines a drive mode. Specifically, the drive mode is determined, such as following driving for following a forward vehicle, overtaking driving for overtaking the forward vehicle, lane change driving for changing a driving lane, merging driving for merging into a main line of a highway or a toll road, lane keeping driving for keeping the lane so as not to deviate from the driving lane, constant speed driving, deceleration driving, or acceleration driving. Then, the target path is generated on the basis of the drive mode.

In the self-drive mode, the driving control unit 46 controls each actuator AC so that the subject vehicle drives along the target path generated by the action plan generation unit 45. That is, a throttle actuator, a shift actuator, a brake actuator, a steering actuator, and the like are controlled so that the subject vehicle passes through a target point P for each unit time.

More specifically, the driving control unit 46 calculates a requested driving force for obtaining the target acceleration for each unit time calculated by the action plan generation unit 45 in consideration of drive resistance determined by a road gradient or the like in the self-drive mode. Then, for example, the actuator AC is feedback controlled so that an actual acceleration detected by the internal sensor group 32 becomes the target acceleration. That is, the actuator AC is controlled so that the subject vehicle drives at the target vehicle speed and the target acceleration. Note that, in the manual drive mode, the driving control unit 46 controls each actuator AC in accordance with a drive command (accelerator opening or the like) from the driver acquired by the internal sensor group 32.

Meanwhile, when the subject vehicle position is recognized using image data around the subject vehicle captured by the camera (not illustrated) of the external sensor group 31 (hereinafter referred to as captured image data or simply captured image), the subject vehicle position recognition unit 43 recognizes (estimates) the subject vehicle position on the basis of a relative positional relationship with reference to the object around the subject vehicle. In more detail, the subject vehicle position recognition unit 43 calculates the distance between the subject vehicle and the object on the basis of the feature point of the object extracted from the captured image around the subject vehicle, and estimates the position of the subject vehicle on the environmental map on the basis of the calculated distance. The feature point is a characteristic portion in the image, and is, for example, an intersection of edges (a corner of a building or road sign). The environmental map is a three-dimensional cloud map on which feature points are plotted.

Figure 2A:
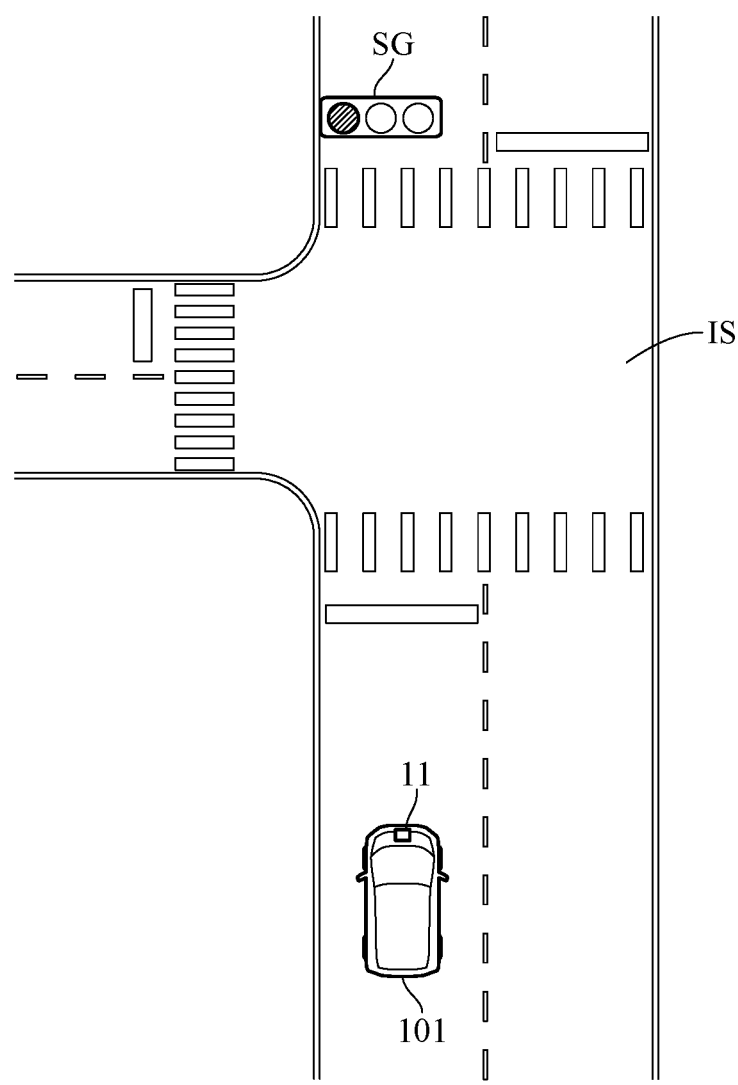
FIG. 2A is a plan view of an intersection in a traveling direction of a vehicle.
Figure 2B:
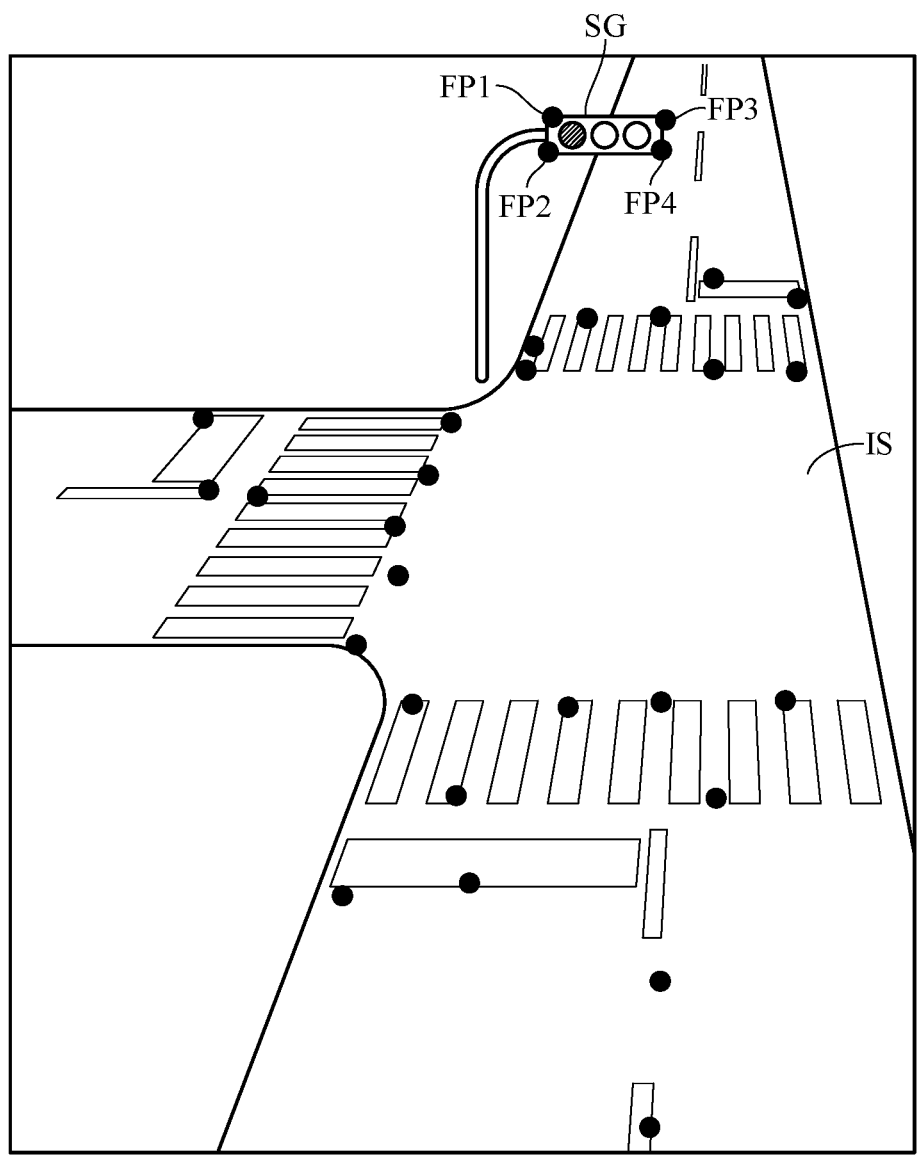
FIG. 2B is a diagram schematically illustrating an image captured by an in-vehicle camera and feature points extracted in the image.

FIG. 2A is a plan view of an intersection IS in a traveling direction of a subject vehicle (vehicle 101). FIG. 2A illustrates the intersection (T-junction) IS where roads of one lane on each side of left-hand traffic cross. FIG. 2B is a diagram schematically illustrating an image of a space in front of the vehicle 101 captured by an in-vehicle camera (camera 11 in FIG. 3 to be described below) of the vehicle 101 in FIG. 2A and feature points extracted from the image. The captured image in FIG. 2B is a captured image of a space in front of the vehicle 101 acquired by the in-vehicle camera of the vehicle 101 that is about to enter the intersection IS. Black circles in the drawing schematically represent feature points extracted from the captured image. When calculating the distance to a traffic light SG illustrated in FIG. 2A, the subject vehicle position recognition unit 43 calculates the distance to the traffic light SG on the basis of feature points FP1, FP2, FP3, and FP4 corresponding to the traffic light SG.

However, since the distances from the traffic light SG to the respective feature points are different from each other, the calculation result varies depending on which feature point among the feature points FP1, FP2, FP3, and FP4 is used for distance calculation when the distance from the traffic light SG is calculated. Furthermore, even when the same object is imaged at the same position and angle of view by the in-vehicle camera, the position and the number of feature points corresponding to the object extracted from the captured image change depending on the time zone, the weather, the background, and the like at the time of imaging. Therefore, when the distance between the subject vehicle and the object is to be calculated on the basis of the feature point of the object, the calculation result may vary. Furthermore, this may cause variations in estimation of the subject vehicle position. Therefore, in the present embodiment, the vehicle position estimation apparatus is configured as described below so as to accurately calculate the distance to the object and reduce the variation in the result of estimation of the subject vehicle position when the subject vehicle position is estimated on the basis of the relative positional relationship with reference to the object around the subject vehicle.

Figure 3:
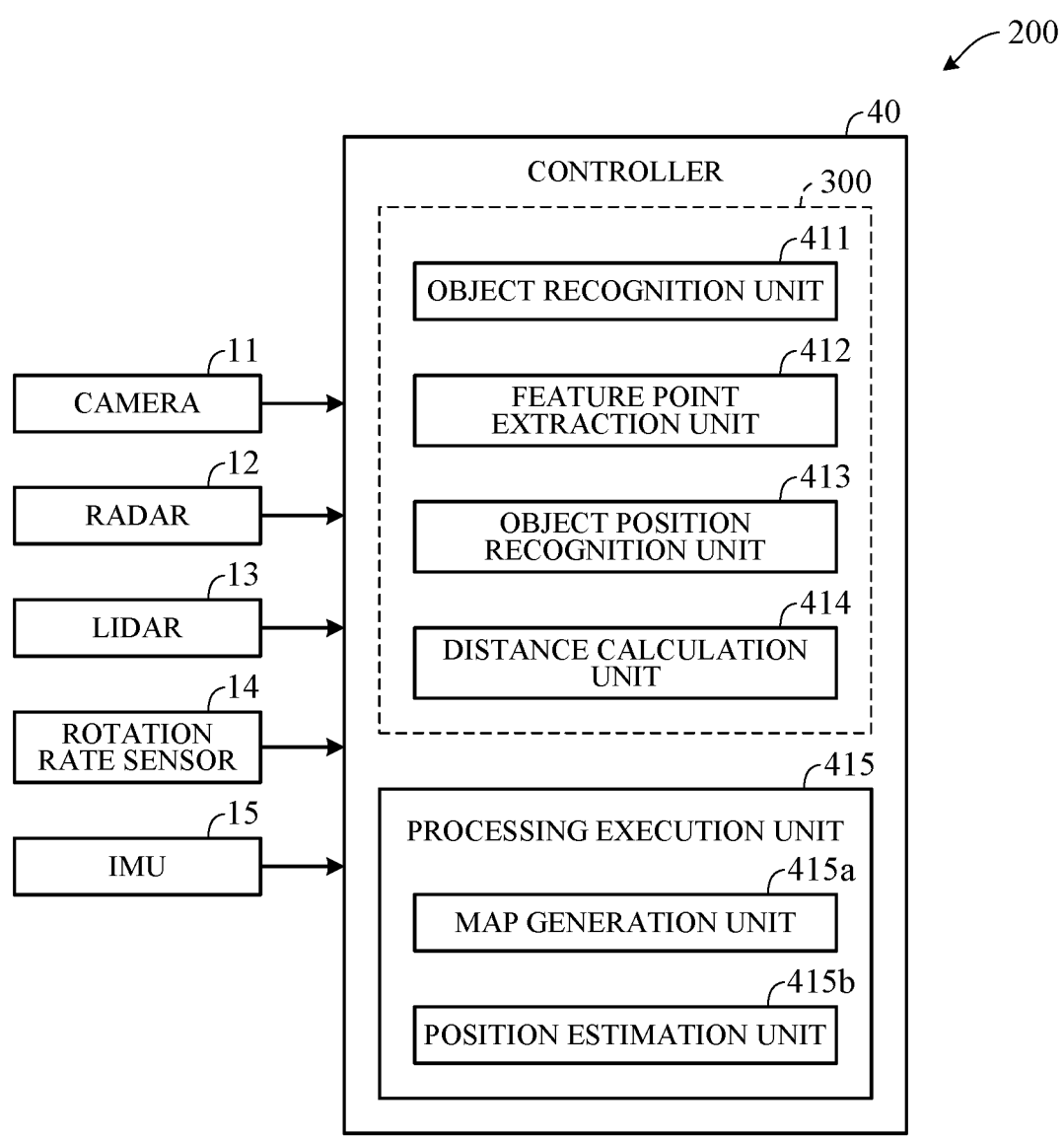
FIG. 3 is a block diagram illustrating a configuration of a main part of a vehicle position estimation apparatus according to the present embodiment.

FIG. 3 is a block diagram illustrating a configuration of a main part of a vehicle position estimation apparatus 200 according to the present embodiment. The vehicle position estimation apparatus 200 estimates the vehicle current position of the vehicle 101, and constitutes a part of the vehicle control system 10 in FIG. 1. As illustrated in FIG. 3, the vehicle position estimation apparatus 200 includes the controller 40, the camera 11, a radar 12, a LiDAR 13, a rotation rate sensor 14, and an inertial measurement unit (IMU) 15. Furthermore, the vehicle position estimation apparatus 200 includes a distance calculation apparatus 300 constituting a part of the vehicle position estimation apparatus 200. The distance calculation apparatus 300 calculates (measures) a distance between the vehicle 101 and an object around the vehicle 101.

The camera 11 is a monocular camera having an imaging element (image sensor) such as a CCD or a CMOS, and constitutes a part of the external sensor group 31 in FIG. 1. The camera 11 may be a stereo camera. The camera 11 is attached to, for example, a predetermined position at the front of the vehicle 101, continuously captures an image of a space in front of the vehicle 101, and acquires an image (camera image) of a subject. The camera 11 outputs image data including a camera image to the controller 40. The radar 12 is mounted on the vehicle 101, and detects an object by emitting electromagnetic waves and detecting reflected waves. The radar 12 outputs a detection value (detection data) to the controller 40. The LiDAR 13 is mounted on the vehicle 101, and measures scattered light with respect to irradiation light in all directions of the vehicle 101 and detects a distance from the vehicle 101 to an object. The LiDAR 13 outputs a detection value (detection data) to the controller 40.

As illustrated in FIG. 3, the controller 40 includes, as functional configurations borne by the processing unit 41, an object recognition unit 411, a feature point extraction unit 412, an object position recognition unit 413, a distance calculation unit 414, and a processing execution unit 415. Note that the object recognition unit 411, the feature point extraction unit 412, the object position recognition unit 413, and the distance calculation unit 414 are included in the distance calculation apparatus 300. Furthermore, the object recognition unit 411 includes, for example, the exterior environment recognition unit 44 in FIG. 1. Furthermore, the feature point extraction unit 412, the object position recognition unit 413, the distance calculation unit 414, and the processing execution unit 415 are configured by, for example, the subject vehicle position recognition unit 43 in FIG. 1. Further, the camera 11 may be included in the distance calculation apparatus 300.

The object recognition unit 411 recognizes an object on the basis of the captured image acquired by the camera 11. In more detail, the object recognition unit 411 calculates the similarity by comparing the captured image with images (comparative images) of various objects (traffic lights, road signs, vehicles, sidewalks, and the like) stored in advance in the memory unit 42. The object recognition unit 411 recognizes an object shown on the captured image on the basis of the calculated similarity. For example, when the similarity between the object included in the captured image and the traffic light included in the comparative image is a predetermined degree, the object recognition unit 411 recognizes the object included in the captured image as the traffic light. The similarity is calculated by collation (pattern matching) with patterns of various objects learned from the comparative image using machine learning such as deep learning. Note that the similarity calculation method is not limited thereto.

The feature point extraction unit 412 extracts feature points included in the captured image acquired by the camera 11. When a predetermined object (also referred to as a target object) is recognized by the object recognition unit 411, the object position recognition unit 413 recognizes the representative position of the predetermined object on the basis of the distribution of feature points corresponding to the predetermined object among the feature points extracted by the feature point extraction unit 412. In more detail, the object position recognition unit 413 calculates the centroid of the feature points on the basis of the distribution of the feature points included in the region corresponding to the predetermined object in the captured image among the feature points extracted by the feature point extraction unit 412, and recognizes the calculated centroid as the representative position. Note that the predetermined object is a stationary object such as a building, a road sign, or a traffic light.

Figure 4:
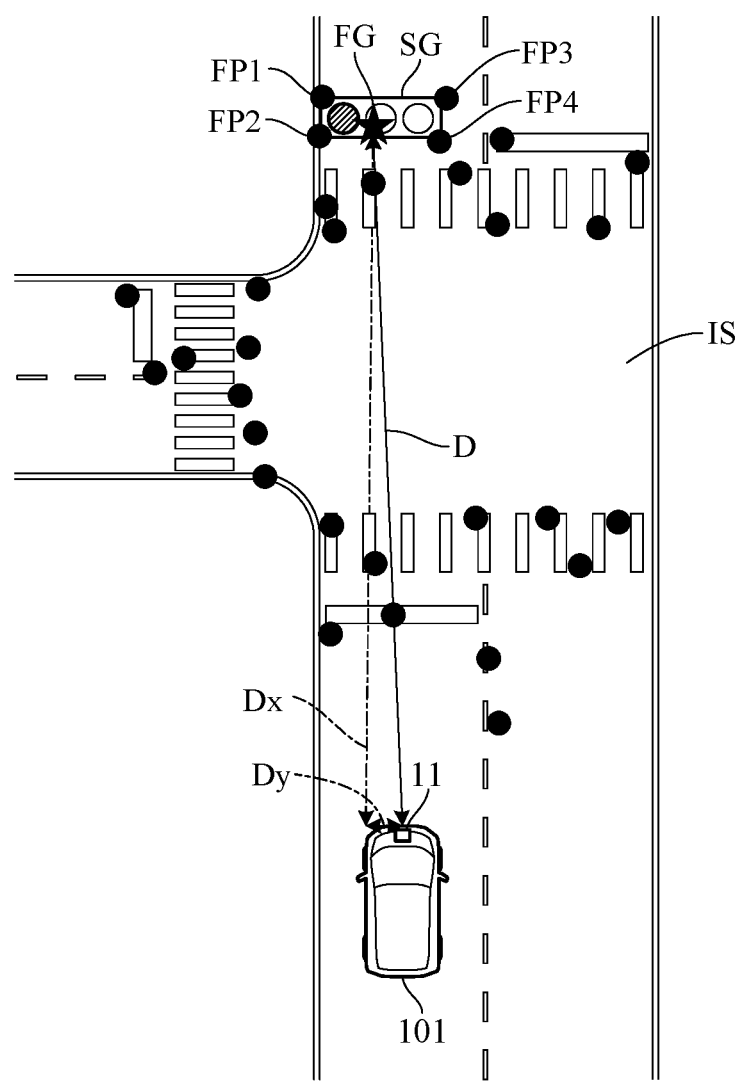
FIG. 4 is a diagram for explaining recognition of a representative position of a object.

Here, recognition of the representative position of a predetermined object will be described with reference to FIG. 4. FIG. 4 is a diagram for explaining recognition of the representative position of a traffic light SG in FIG. 2A. Note that, for simplification of description, a case where the real space is two-dimensional (plane) is taken as an example, but also in a case where the real space is three-dimensional, the representative position of the predetermined object is recognized in a similar manner.

The object position recognition unit 413 converts the position coordinates (position coordinates on the captured image) of the feature points FP1, FP2, FP3, and FP4 of the traffic light SG extracted from the captured image of FIG. 2B into values on the environmental map, and calculates the position coordinates of the feature points FP1, FP2, FP3, and FP4 on the environmental map. The object position recognition unit 413 obtains the centroid of the feature points FP1, FP2, FP3, and FP4 on the basis of the distribution of the feature points FP1, FP2, FP3, and FP4 represented by the calculated position coordinates of the feature points FP1, FP2, FP3, and FP4 on the environmental map. Here, the object position recognition unit 413 averages the position coordinates of the feature points FP1, FP2, FP3, and FP4 on the environmental map to calculate the position coordinates of the centroid on the environmental map. When the position coordinates of the feature points FP1, FP2, FP3, and FP4 are (X1, Y1), (X2, Y2), (X3, Y3), and (X4, Y4), respectively, the position coordinates of the centroid are calculated as ((X1+X2+X3+X4)/4, (Y1+Y2+Y3+Y4)/4). A star in FIG. 4 schematically represents the centroid of the feature points FP1, FP2, FP3, and FP4.

The distance calculation unit 414 calculates the distance from the subject vehicle position to the representative position of the predetermined object recognized by the object recognition unit 411. For example, when the camera 11 is a monocular camera, the distance calculation unit 414 calculates a distance (distance in real space) D to centroid FG using a plurality of captured images (a plurality of captured images at different imaging time points including centroid FG within an angle of view) of the camera 11. A distance Dx illustrated in FIG. 4 represents a distance in an X-axis direction (traveling direction), and a distance Dy represents a distance in a Y-axis direction (vehicle width direction). A relative positional relationship between the vehicle 101 and the centroid FG is determined by the distances Dx and Dy. Note that when the real space is three-dimensional, the distance D is represented by a distance Dz representing a distance in a Z-axis direction (vertical direction) in addition to the distance Dx and the distance Dy.

The processing execution unit 415 includes a map generation unit 415a and a position estimation unit 415b. The map generation unit 415a executes map generation processing of generating an environmental map (cloud map) using the feature points extracted by the feature point extraction unit 412. The position estimation unit 415b executes position estimation processing of estimating the position of the vehicle 101 on the environmental map. Note that the map generation unit 415a and the position estimation unit 415b are configured to perform the map generation processing and the position estimation processing in parallel according to an algorithm of simultaneous localization and mapping (SLAM). When the vehicle 101 is driving, the map generation processing by the map generation unit 415a and the position estimation processing by the position estimation unit 415b are performed in parallel, so that the vehicle 101 can drive while creating the environmental map and recognizing the subject vehicle position on the environmental map.

The map generation unit 415a converts the position coordinates (value represented in a coordinate system of the captured image) of the feature points extracted by the feature point extraction unit 412 into values represented in a coordinate system of the environmental map and plots the feature points on the environmental map.

The position estimation unit 415b executes the position of the vehicle 101 on the environmental map. Specifically, the position estimation unit 415b calculates a relative position of the vehicle 101 on the environmental map with reference to a predetermined object on the basis of the position coordinates (position coordinates on the environmental map) of the representative position of the predetermined object recognized by the object position recognition unit 413 and the distance D calculated by the distance calculation unit 414, and estimates the calculated position as the position of the vehicle 101 on the environmental map. Furthermore, the position estimation unit 415b corrects an error in position estimation on the basis of the moving direction and the moving amount of the vehicle 101 calculated by odometry using the rotation rate sensor 14 and the IMU 15.

Figure 5:
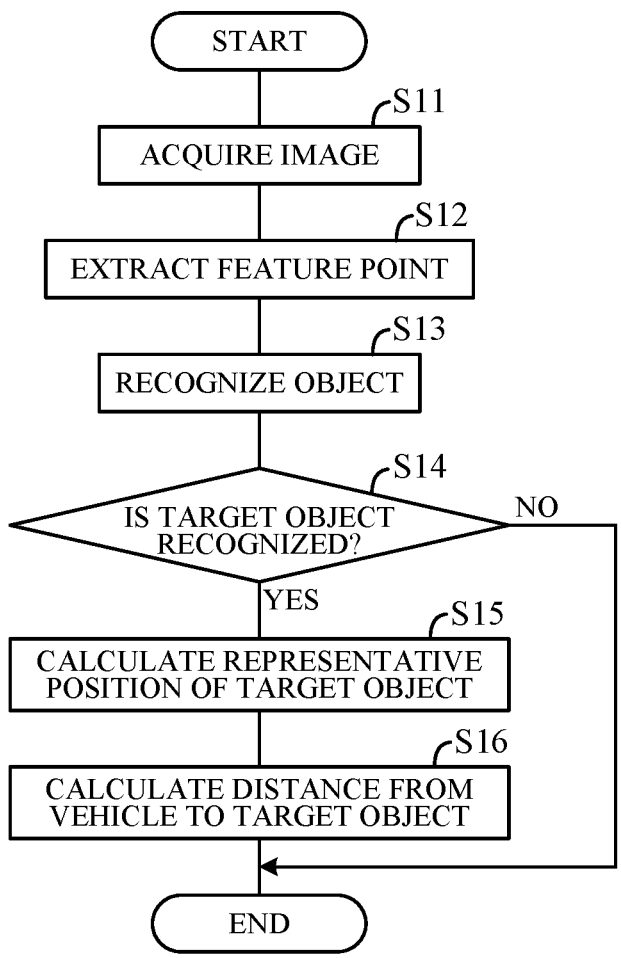
FIG. 5 is a flowchart illustrating an example of processing executed by the CPU of the controller in FIG. 3.

FIG. 5 is a flowchart illustrating an example of processing executed by the CPU of the controller 40 in FIG. 3 according to a prestored program. The processing (distance calculation processing) illustrated in the flowchart is started when, for example, the controller 40 is powered on, and is repeated at a predetermined cycle.

First, in step S11, an image (captured image) captured by the camera 11 is acquired. In step S12, feature points are extracted from the captured image acquired in step S11. In step S13, an object shown on the captured image acquired in step S11 is recognized. In step S14, it is determined whether or not a predetermined object (target object) is included in the object recognized in step S13. If the determination is negative in step S14, the processing ends. When the determination is affirmative in step S14, the centroid of the feature points corresponding to the target object among the feature points extracted in step S11 is recognized as the representative position of the target object in step S15. More specifically, the position coordinates of the centroid of the feature points are calculated on the basis of the position coordinates of each feature point corresponding to the target object. In step S16, the distance from the vehicle 101 (camera 11) to the representative position of the target object is calculated.

The present embodiment can achieve advantages and effects such as the following:

(1) The distance calculation apparatus 300 includes the camera 11 that detects a situation around the vehicle 101, the object recognition unit 411 that recognizes an object on the basis of detection data (captured image) detected by the camera 11, the feature point extraction unit 412 that extracts feature points included in the detection data detected by the camera 11, the object position recognition unit 413 that recognizes a representative position of a predetermined object on the basis of a distribution of feature points corresponding to the predetermined object among the feature points extracted by the feature point extraction unit 412 when the predetermined object is recognized by the object recognition unit 411, and the distance calculation unit 414 that calculates a distance from the vehicle 101 to the predetermined object on the basis of the representative position recognized by the object position recognition unit 413. Thus, when calculating the distance to the predetermined object on the basis of the feature points extracted from the captured image of the camera 11, the distance to the predetermined object can be accurately calculated even when there is a plurality of feature points corresponding to the predetermined object. Furthermore, it is thus possible to suppress the occurrence of variations in the estimation of the subject vehicle position and to accurately estimate the subject vehicle position.

(2) The object position recognition unit 413 calculates the centroid of the feature points corresponding to the predetermined object on the basis of the distribution of the feature points extracted by the feature point extraction unit 412, and recognizes the centroid as the representative position. Thus, it is possible to further suppress the occurrence of variations in the estimation of the subject vehicle position.

(3) The vehicle position estimation apparatus 200 includes the distance calculation apparatus 300, the map generation unit 415a that generates a map (environmental map) using feature points included in a captured image detected by the camera 11 that detects a situation around the vehicle 101, and the position estimation unit 415b that estimates the position of the vehicle 101 on the map generated by the map generation unit 415a on the basis of the distance to a predetermined object calculated by the distance calculation apparatus 300. Thus, it is possible to accurately estimate the subject vehicle position on the map.

(4) In the vehicle position estimation apparatus 200, the map generation unit 415a and the position estimation unit 415b are configured such that the processing of generating a map and the processing of estimating the position of the vehicle 101 on the map are executed in parallel. Thus, it is possible to generate an environmental map and accurately estimate the subject vehicle position on the generated environmental map.

The above embodiment may be modified into various forms. Hereinafter, some modifications will be described. In the above embodiment, the camera 11 captures an image of a space in front of the vehicle 101, but the configuration of an in-vehicle detection unit is not limited to that described above. For example, the in-vehicle detection unit may capture an image of a space in the left-right direction or the rear of the vehicle 101. Furthermore, in the above embodiment, the configuration in which the position of the vehicle 101 is estimated using the captured image acquired by the camera 11 is taken as an example, but the position of the vehicle 101 may be estimated using detection data (three-dimensional point cloud data) acquired by the radar 12 or the LiDAR 13. That is, the in-vehicle detection unit may be a detector other than the camera 11, such as the radar 12 or the LiDAR 13.

Furthermore, in the above embodiment, the centroid of the feature points included in the region corresponding to the predetermined object is recognized as the representative position of the predetermined object, but the configuration of the object position recognition unit is not limited to that described above. The object position recognition unit may recognize a point (position) other than the centroid of the feature points as the representative position of the predetermined object. Furthermore, in the above embodiment, the position coordinates of the centroid of the predetermined object are calculated by averaging the position coordinates of the plurality of feature points included in the region corresponding to the predetermined object, but the position coordinates of the centroid may be calculated by weighting the feature points and considering the weight. For example, a larger weight may be set for a feature point (for example, a feature point corresponding to a corner of an object) having a higher discrimination in recognizing the object, and the position coordinates of the centroid of the object may be calculated in consideration of the set weight. As a specific example, each of the position coordinates of the plurality of feature points included in the region corresponding to the object is multiplied by a weight set according to the level of the discrimination of the feature point, and the position coordinates of the centroid of the object are calculated using the position coordinates of each feature point multiplied by the weight. Thus, it is possible to suppress variations in results of calculation of the centroid of the object even in a situation where the positions and the number of feature points of the object extracted from the captured image change depending on the time zone, the weather, the background, and the like at the time of imaging. Furthermore, when the centroid of the predetermined object is calculated on the basis of the feature points included in the region corresponding to the predetermined object, the centroid may be calculated after performing clustering on the feature points to remove noise (feature points that are not normally extracted from the region corresponding to the predetermined object). Thus, the centroid of the object can be calculated more accurately.

Further, in the above embodiment, although the vehicle position estimation apparatus 200 and the distance calculation apparatus 300 are applied to the vehicle control system of the self-driving vehicle, the vehicle position estimation apparatus 200 and the distance calculation apparatus 300 are also applicable to vehicles other than the self-driving vehicle. For example, the vehicle position estimation apparatus 200 and the distance calculation apparatus 300 can also be applied to a manual driving vehicle including advanced driver-assistance systems (ADAS).

The present invention can be configured as a distance calculation method including recognizing an object on the basis of a detection data detected by an in-vehicle detection unit configured to detect a situation around a subject vehicle, extracting feature points included in the detection data, recognizing a representative position of a predetermined object on the basis of a distribution of feature points corresponding to the predetermined object among the feature points extracted in the extracting when the predetermined object is recognized in the recognizing, and calculating a distance from the subject vehicle to the predetermined object on the basis of the representative position recognized in the recognizing.

The present invention also can be configured as a distance calculation method including recognizing an object on the basis of a detection data detected by an in-vehicle detection unit configured to detect a situation around a subject vehicle, extracting feature points included in the detection data, recognizing a representative position of a predetermined object on the basis of a distribution of feature points corresponding to the predetermined object among the feature points extracted in the extracting when the predetermined object is recognized in the recognizing, and calculating a distance from the subject vehicle to the predetermined object on the basis of the representative position recognized in the recognizing.

The present invention can accurately calculate the distance to the object around the vehicle.

Above, while the present invention has been described with reference to the preferred embodiments thereof, it will be understood, by those skilled in the art, that various changes and modifications may be made thereto without departing from the scope of the appended claims.

What is claimed is:

1. A distance calculation apparatus for calculating a distance from a subject vehicle to a predetermined object, comprising:
   a camera configured to detect a situation around the subject vehicle; and
   a microprocessor and a memory connected to the microprocessor, wherein
   the microprocessor is configured to perform
   recognizing objects on the basis of captured images acquired by the camera;
   extracting feature points included in the captured images;
   when the predetermined object is recognized on the basis of a captured image, calculating a centroid of feature points corresponding to the predetermined object among the feature points on the basis of a distribution of the feature points corresponding to the predetermined object; and
   calculating a distance from the subject vehicle to the centroid as the distance from the subject vehicle to the predetermined object, and wherein the camera is a monocular camera, and
the microprocessor is configured to perform
the calculating the distance including calculating the distance from the subject vehicle to the centroid on the basis of a plurality of the captured images acquired by the camera at different imaging time points and including the centroid within an angle of view.

2. A distance calculation apparatus for calculating a distance from a subject vehicle to a predetermined object, comprising:
a camera configured to detect a situation around the subject vehicle; and
a microprocessor and a memory connected to the microprocessor, wherein
the microprocessor is configured to perform:
recognizing objects on the basis of captured images acquired by the camera;
extracting feature points included in the captured images;
when the predetermined object is recognized on the basis of a captured image, calculating a centroid of feature points corresponding to the predetermined object among the feature points on the basis of a distribution of the feature points corresponding to the predetermined object; and
calculating a distance from the subject vehicle to the centroid as the distance from the subject vehicle to the predetermined object, and wherein
the microprocessor is configured to perform
the calculating the centroid including setting, for each of the feature points corresponding to the predetermined object, a larger weight for a feature point having a higher discrimination, multiplying a position coordinate of each of the feature points corresponding to the predetermined object by the weight, and calculating a position coordinate of the centroid of the predetermined object on the basis of the position coordinate of each of the feature points multiplied by the weight, and
the calculating the distance including calculating the distance on the basis of the distance from the subject vehicle to the position coordinate of the centroid.

3. A vehicle position estimation apparatus comprising:
a camera configured to detect a situation around a subject vehicle; and
a microprocessor and a memory connected to the microprocessor, wherein
the memory stores a map, and
the microprocessor is configured to perform:
recognizing objects on the basis of captured images acquired by the camera;
extracting feature points included in the captured images;
when a predetermined object is recognized on the basis of a captured image, calculating a centroid of feature points corresponding to the predetermined object among the feature points on the basis of a distribution of the feature points corresponding to the predetermined object;
calculating a distance from the subject vehicle to the centroid as a distance from the subject vehicle to the predetermined object; and
estimating a position of the subject vehicle on the map on the basis of the distance from the subject vehicle to the centroid and a position of the centroid on the map, and wherein
the camera is a monocular camera, and
the microprocessor is configured to perform
the calculating the distance including calculating the distance from the subject vehicle to the centroid on the basis of a plurality of the captured images acquired by the camera at different imaging time points and including the centroid within an angle of view.

4. The vehicle position estimation apparatus according to claim 3, wherein
the microprocessor is configured to perform
generating the map based on the feature points included in the captured images, wherein
the generating the map and the estimating the position of the subject vehicle on the map are executed in parallel.

5. The vehicle position estimation apparatus according to claim 3, wherein
the microprocessor is configured to perform
the calculating the centroid including setting, for each of the feature points corresponding to the predetermined object, a larger weight for a feature point having a higher discrimination, multiplying a position coordinate of each of the feature points corresponding to the predetermined object by the weight, and calculating a position coordinate of the centroid of the predetermined object on the basis of the position coordinate of each of the feature points multiplied by the weight, and
the calculating the distance including calculating the distance on the basis of the distance from the subject vehicle to the position coordinate of the centroid.

* * * * *